United States Patent
Gao et al.

(10) Patent No.: US 9,219,569 B2
(45) Date of Patent: Dec. 22, 2015

(54) METHOD AND APPARATUS FOR OPTIMIZING RATE CONTROL BASED ON PACKET AGGREGATION CONSIDERATIONS

(71) Applicant: QUALCOMM Incorporated, San Diego, CA (US)

(72) Inventors: Qinghai Gao, San Jose, CA (US); Vishnu Vardhan Bala Krishnan, San Diego, CA (US); Shu Du, Milpitas, CA (US); Zhanfeng Jia, Belmont, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 320 days.

(21) Appl. No.: 13/843,720

(22) Filed: Mar. 15, 2013

(65) Prior Publication Data

US 2014/0254424 A1    Sep. 11, 2014

Related U.S. Application Data

(60) Provisional application No. 61/775,552, filed on Mar. 9, 2013.

(51) Int. Cl.
   *H04L 12/28*   (2006.01)
   *H04B 7/14*    (2006.01)
   *H04L 1/00*    (2006.01)
   *H04L 1/16*    (2006.01)
   *H04W 28/22*   (2009.01)

(52) U.S. Cl.
   CPC ............ *H04L 1/0001* (2013.01); *H04L 1/0003* (2013.01); *H04L 1/0007* (2013.01); *H04L 1/0009* (2013.01); *H04L 1/0015* (2013.01); *H04L 1/1628* (2013.01); *H04W 28/22* (2013.01)

(58) Field of Classification Search
   CPC .................................................. H04L 1/0001
   USPC .......................................................... 370/254
   See application file for complete search history.

(56) References Cited

U.S. PATENT DOCUMENTS

| | | | |
|---|---|---|---|
| 2005/0053038 A1* | 3/2005 | Kimura | H04L 1/0021 370/333 |
| 2006/0259627 A1* | 11/2006 | Kellerer et al. | 709/227 |
| 2006/0268933 A1* | 11/2006 | Kellerer et al. | 370/469 |
| 2007/0280130 A1* | 12/2007 | Matsuo | H04W 28/22 370/252 |
| 2008/0254749 A1* | 10/2008 | Ashkenazi et al. | 455/69 |
| 2009/0059877 A1 | 3/2009 | Utsunomiya et al. | |
| 2010/0061345 A1 | 3/2010 | Wengerter et al. | |
| 2010/0238932 A1* | 9/2010 | Kliger et al. | 370/392 |
| 2010/0281333 A1* | 11/2010 | Jongren et al. | 714/752 |
| 2011/0069648 A1 | 3/2011 | Lee et al. | |
| 2012/0176884 A1 | 7/2012 | Zhang et al. | |
| 2012/0207054 A1* | 8/2012 | Okubo | H04L 1/0003 370/252 |

OTHER PUBLICATIONS

Jeon S. et al., "Adaptive Frame Aggregation Scheme for Energy Efficiency in WLAN," IEEE International Conference on Consumer Electronics (ICCE), 2011, pp. 463-464.

* cited by examiner

*Primary Examiner* — Gerald Smarth
(74) *Attorney, Agent, or Firm* — Patterson & Sheridan, L.L.P.

(57) ABSTRACT

Various aspects of the disclosure described herein provide for optimizing rate control during a selection of a communications profile from a set of communications profiles by taking into account effective frame aggregation size as a function of packet error rate (PER). An expected throughput may also be determined for each communications profile and updated after each transmission so that a communications profile having the highest expected throughput may be chosen for a particular frame transmission.

38 Claims, 11 Drawing Sheets

800

EXAMPLE 1: BLOCK ACK BITMAP INDICATES ERROR IN LAST MPDU (MSB) OF THE AMPDU

BACK BITMAP: 0111111111111111111111111111111111111111111111111111111111111111

↑
801

810

EXAMPLE 2: BLOCK ACK BITMAP INDICATES ERROR IN FIRST MPDU (LSB) OF THE AMPDU

BACK BITMAP: 1111111111111111111111111111111111111111111111111111111111111110

↑
811

820

EXAMPLE 3: BLOCK ACK BITMAP INDICATES RANDOM ERRORS IN THE AMPDU

BACK BITMAP: 0111111111110111111111101110111111111101111111111101111101111111

↑
821

EFFECTIVE AGGREGATION SIZE IS AFFECTED BY
PACKET ERROR RATE BECAUSE NEXT AMPDU FRAME
WINDOW SIZE IS AFFECTED BY RANDOM LOCATION OF
FIRST ERROR, AND HIGHER PER = LOWER EFFECTIVE
AGGREGATION SIZE.

*FIG. 8*

Communications Profile (MCS) Throughput Comparison
Frame Aggregation (AGG) Size and Packet Error Rate (PER)

| PER | AGG | MCS9 (Zero PER) | Peak*(1-PER) | PER & AGG Considered | MCS8 (Zero PER) | Peak*(1-PER) | PER & AGG Considered |
|---|---|---|---|---|---|---|---|
| 0 | 64 | 912 | 912 | 912 | 842 | *842* | *842* |
| 0.01 | 52 | 861 | 902.88 | 852.39 | 797 | 833.58 | 789.03 |
| 0.02 | 46 | 829 | 893.76 | 812.42 | 770 | 825.16 | 754.6 |
| 0.03 | 42 | 801 | 884.64 | 776.97 | 749 | 816.74 | 726.53 |
| 0.04 | 40 | 790 | 875.52 | 758.4 | 737 | 808.32 | 707.52 |
| 0.05 | 38 | 774 | *866.4* | *735.3* | 725 | 799.9 | 688.75 |
| 0.1 | 34 | 744 | 820.8 | 669.6 | 697 | 757.8 | 627.3 |
| 0.2 | 28 | 686 | 729.6 | 548.8 | 647 | 673.6 | 517.6 |
| 0.3 | 26 | 662 | 638.4 | 463.4 | 623 | 589.4 | 436.1 |
| 0.4 | 24 | 636 | 547.2 | 381.6 | 602 | 505.2 | 361.2 |
| 0.5 | 22 | 613 | 456 | 306.5 | 578 | 421 | 289 |

FIG. 11

METHOD AND APPARATUS FOR OPTIMIZING RATE CONTROL BASED ON PACKET AGGREGATION CONSIDERATIONS

CLAIM OF PRIORITY UNDER 35 U.S.C. §119

The present application for patent claims priority to Provisional Application No. 61/775,552, entitled "METHOD AND APPARATUS FOR RATE CONTROL BASED ON EFFECTIVE AGGREGATION SIZE" filed Mar. 9, 2013, which is assigned to the assignee hereof and hereby expressly incorporated by reference herein.

BACKGROUND

1. Field

Various aspects of the disclosed approach relate generally to communications systems, and more particularly, to rate control in wireless communications systems that take into account effective aggregation size.

2. Background

Wireless communications technology has penetrated nearly every aspect of a person's daily routine. Integrated into almost every conceivable electronic device to facilitate business activities as well as personal uses such as entertainment, medicine, and exercise, wireless communications systems are widely deployed to provide various types of content such as voice, data, video, and so on. For example, one type of wireless communications system, referred to as a wireless local area network (WLAN), has become commonplace for wirelessly linking one more devices to a local area network for communicating with other networked devices or to each other in an ad-hoc configuration. These devices may also connect to a device referred to as an access point for access to the wider Internet. Most WLANs are based on a set of WLAN protocols as promulgated by the Institute of Electrical and Electronic Engineers (IEEE) that provides a set of standards which allow manufacturers that follow them to build interoperable wireless devices. Just as importantly, these standards provide a framework for wireless devices to operate under a variety of environments, and users benefit because they have mobility to move around within a local coverage area and still have their wireless devices be connected to the network.

Of course, as the user moves with the wireless device from one location to another, the wireless device will experience an impact to its ability to communicate at a particular data rate via a communications link due to a variety of factors. For example, physical layer (PHY) transmission properties, media access control layer (MAC) protocols, and environmental factors may all impact reliability and throughput of communications on the communications link. Thus, when the communications link suffers from increased noise and/or interference, lower data rates may have to be used to ensure a particular data rate is achieved. Conversely, when the communications link experiences improved link conditions, higher data rates may be communicated reliably.

Typically, a set of communications profiles are predefined between wireless devices so as to limit an amount of overhead that may need to communicated before a communications link is establish, such as information about what parameters are being used for each transmission. Each communications profile in the set of communications profiles typically stores a different version of the parameters, where each version is customized to achieve a particular data rate under a variety of conditions. For example, each communications profile may have associated PHY transmission or MAC protocol property options that may maximize throughput under a particular link condition. Although no particular data rate can be guaranteed over all conditions, it is expected that more robust communications profiles may provide a higher probability of successful transmissions, albeit at a lower data rate. Thus, the set of communications profiles may include communications profiles that support a range of data rates. A particular communications profile may then be selected based on a desired data rate.

For example, consider a situation where a transmitting device uses a first communications profile to communicate at a first data rate to a receiving device over a communications link. At a particular point during a series of transmissions over the communications link, if the transmitting device determines from feedback by the receiving device that the communications link is suffering from a sufficient level of interference that will not allow the current, first data rate to be sustained, then the transmitting device may adjust the data rate for future transmissions simply by selecting another predefined communications profiles from the set of communications profiles. In general, the process of choosing a particular communications profile in an attempt to achieve an optimized data rate for a particular link condition is referred to as "data rate control," or "rate control" for short. The process may also be known as "rate adaptation."

As communications technology has evolved, the number of options available for dealing with different types of link conditions has increased. For example, the set of communications profiles may be configured with communications profiles having various orthogonal frequency division multiplexing (OFDM) modulation techniques, enhanced modulation and coding schemes (MCS), and/or multiple-input multiple-output (MIMO) antenna configurations. However, although many possible communications profiles may be available in the set of communications profiles, current approaches for communications profile selection during rate control are not optimized, and may unnecessarily limit an actual amount of data a wireless device could communicate.

In order to be able to support increased data rates by optimizing rate control techniques, other approaches are desired.

SUMMARY

The following description presents a simplified summary of one or more aspects of the disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the disclosure provides a method for optimizing rate control using a set of communications profiles by incorporating and considering factors such as aggregation size in addition to an error metric associated with each communications profile in the set of communications profiles during selection of a particular communications profile. In general, aggregation size represents a number of data units that may be aggregated for transmission in a particular transmission attempt over a communications link, and the error metric represents a particular level of errors that may be experienced by each transmission over the communications link, such as a packet error rate (PER). In one aspect of the disclosed approach, the particular communications profile may be selected based on a level of expected throughput associated with that communications profile, where the expected throughput is determined based on an aggregation size modified as a function of the error metric. The modified aggregation size may be referred to as an "effective aggregation size" as it represents a reduced number of aggregated data units that may be transferred successfully when the communications link is subject to the error metric.

In one aspect of the disclosed approach, a method for wireless communications is provided that includes detecting a receipt of a communications acknowledgment related to a transmission of a first frame using a first communications profile, where the first communications profile is selected from a plurality of communications profiles. A communications error parameter is then determined from the detection of the receipt of the communications acknowledgement for the first communications profile; and an effective aggregation size is determined based on the communications error parameter. A second communications profile from the plurality of communications profiles is selected based on the communications error parameter and the effective aggregation size, and a second frame is transmitted using the second communications profile.

Another aspect of the disclosure provides an apparatus for wireless communications that includes means for detecting a receipt of a communications acknowledgment related to a transmission of a first frame using a first communications profile, where the first communications profile is selected from a plurality of communications profiles. A means for determining a communications error parameter from the detection of the receipt of the communications acknowledgement for the first communications profile; and a means for determining an effective aggregation size based on the communications error parameter are also included in the apparatus. A means for selecting a second communications profile from the plurality of communications profiles based on the communications error parameter and the effective aggregation size, is further included in the apparatus for a means for transmitting a second frame using the second communications profile.

Yet another aspect of the disclosure provides a computer program product that includes a computer-readable storage medium having code executable by a processing system for detecting a receipt of a communications acknowledgment related to a transmission of a first frame using a first communications profile selected from a plurality of communications profiles; determining a communications error parameter from the receipt of the communications acknowledgement for the first communications profile; determining an effective aggregation size based on the communications error parameter; selecting a second communications profile from the plurality of communications profiles based on the communications error parameter and the effective aggregation size; and, transmitting a second frame using the second communications profile.

Still yet another aspect of the disclosure provides a wireless device that includes an antenna and a receiver configured to detect, via the antenna, a receipt of a communications acknowledgment related to a transmission of a first frame using a first communications profile selected from a plurality of communications profiles. The wireless device also includes a processing system configured to determine a communications error parameter from the detection of the receipt of the communications acknowledgement for the first communications profile; determining an effective aggregation size based on the communications error parameter; and, selecting a second communications profile from the plurality of communications profiles based on the communications error parameter and the effective aggregation size; and, a transmitter configured to transmit a second frame using the second communications profile.

Still yet another aspect of the disclosure provides an apparatus for wireless communications that includes at least one processor and a memory coupled to the at least one processor and configured to cause the at least one processor to detecting a receipt of a communications acknowledgment related to a transmission of a first frame using a first communications profile selected from a plurality of communications profiles; determine a communications error parameter from the receipt of the communications acknowledgement for the first communications profile; determine an effective aggregation size based on the communications error parameter; select a second communications profile from the plurality of communications profiles based on the communications error parameter and the effective aggregation size; and, transmit a second frame using the second communications profile.

These and other aspects of the disclosure will become more fully understood upon a review of the detailed description, which follows.

BRIEF DESCRIPTION OF THE DRAWINGS

These and other sample aspects of the disclosure will be described in the detailed description that follow, and in the accompanying drawings.

FIG. 8 is a conceptual diagram illustrating several examples of frame aggregation feedback in accordance with various aspects of the disclosure.

FIG. 11 is a table illustrating an improvement in expected data throughput for a rate control approach configured in accordance with various aspects of the disclosed approach when an effective aggregation size is considered during communications profile selection.

Figure 1:
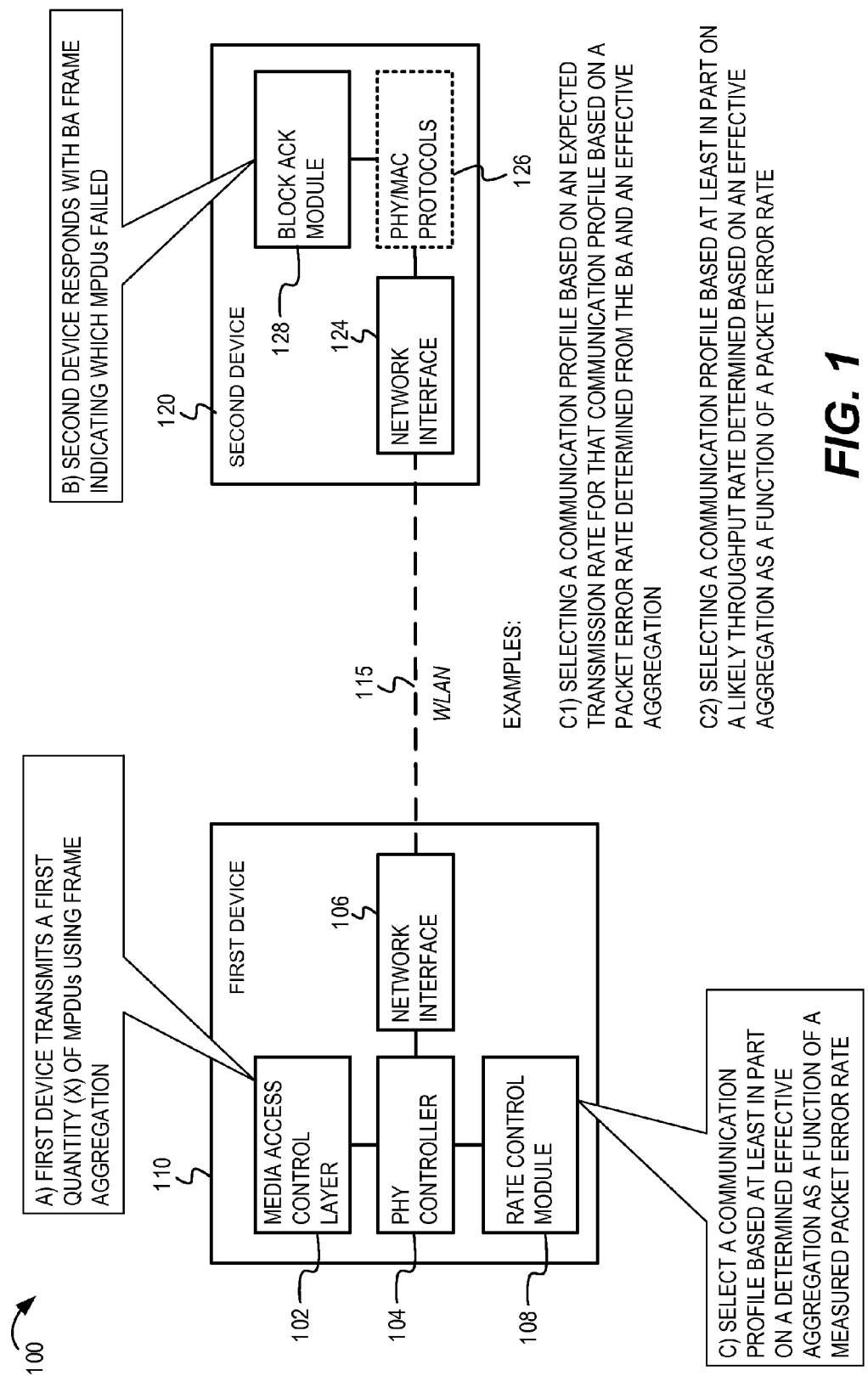
FIG. 1 is a system diagram illustrating an example aspect of rate control based on an effective aggregation as a function of a determined PER.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect of the disclosure provided herein may be embodied by one or more elements of a claim.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A frame aggregation scheme was introduced in the IEEE 802.11e standard for WLANs as a MAC-layer enhancement for reducing PHY protocol overheads. One type of frame aggregation, also referred to as MAC protocol data unit (MPDU) aggregation, MAC-layer aggregation, or simply, aggregation, involves a technique in which MPDUs are aggregated into a single PHY transmission frame for transmission from a transmitting device to a receiving device. A PHY transmission frame that includes aggregated MPDUs may be referred to as an aggregated MPDU (AMPDU or A-MPDU) frame or transmission, aggregated frame or transmission, or simply frame or transmission. Another approach for frame aggregation involves concatenating several MAC Service Data Units (MSDUs). Once the receiving device has processed the transmitted frame, it may provide feedback to the transmitting device, as further described herein. The IEEE 802.11n standard provided improvements to the frame aggregation scheme and improvements to frame aggregation feedback such as feedback messages associated with frame aggregation. Other wireless and wireline technologies may also utilize frame aggregation and feedback.

An example of frame aggregation feedback is a block acknowledgement (BA) message, or BA frame, that a recipient of an AMPDU frame may use to acknowledge multiple MPDUs in a single BA frame. Typically, the BA frame includes a bitmap which identifies acknowledgement (often indicated as a "1" value) or non-acknowledgement (often indicated as a "0" value) for each particular MPDU in the AMPDU frame. Each bit of the bitmap typically represents an indication of whether the recipient successfully received and decoded a particular MPDU. A compressed block acknowledgement is a form of a BA frame that has a smaller bitmap and may be used for feedback of AMPDU frames that only include non-fragmented MPDUs. Where there is a total failure in reception of an AMPDU frames by a receiving device, no BA frame will be received by the transmitting device and the transmitting device may assume that the AMPDU frame was not received after a predetermined time.

In a traditional communications system, a transmitting device may receive a BA frame from a receiving device to indicate transmission success/failure of each MDPUs in an AMPDU frame transmitted using a particular communications profile chosen from a set of communications profiles. Currently, the standard for some WLAN networks allow up to 64 MPDUs to be included in an AMPDU frame. The quantity of MPDUs included in an AMPDU frame may be referred to as a frame aggregation window size, an aggregation window size, a frame aggregation size, an aggregation size, or simply an aggregation. An error metric, also referred to as a communications error parameter, may be determined by the transmitting device for each transmission of an AMPDU frame. The communications error parameter may be determined based on feedback from a BA frame. The communications error parameter may also be determined by measurements made by the transmitting device, in addition to other approaches. For example, a PER may be determined based on the number of MPDUs that were successfully received.

To perform rate control where a transmitting device may select from a set of communications profiles, existing approaches provide that a transmitting device may choose a particular communications profile based on PER. For example, the transmitting device may initially choose a communications profile having a particular modulation and coding scheme (MCS) based on feedback associated with a PER determined from a previous AMPDU frame transmission. Then, after another AMPDU frame transmission, the transmitting device may determine that a change in a currently determined PER determined from the last AMPDU transmission necessitates a change in the communication profile, such as where the currently determined PER has increased. A rate control algorithm at the transmitting device may select a different communications profile based on the currently determined PER. However, as described herein, this may result in a selection of a communications profile that is less than optimal.

In certain scenarios, existing rate control approaches choose a more aggressive rate than they should when determining which communications profile should be used for an AMPDU frame transmission. For example, when deciding whether to use a particular communications profile, existing algorithms typically use either a maximum theoretical PHY or UDP throughput rate associated with the communications profile under consideration as a peak throughput rate, and then calculates throughput as:

$$\text{goodput} = \text{peak\_throughput} * (1 - \text{PER}),$$

where peak_throughput is the maximum theoretical peak PHY or UDP throughput rate, and goodput is an assumed transmission rate based on peak_throughput as reduced by a PER experienced by a previous AMPDU transmission. This determination assumes that a maximum aggregation size, such as a frame aggregation size of 64 MPDUs, may be used for all transmissions. However, in actuality, achievable aggregation size over a series of AMPDU frame transmission decreases as PER increases. Even when a maximum possible BA window size of 64 MPDUs is used, an average aggregation size decreases very quickly as PER increases.

Figure 10:
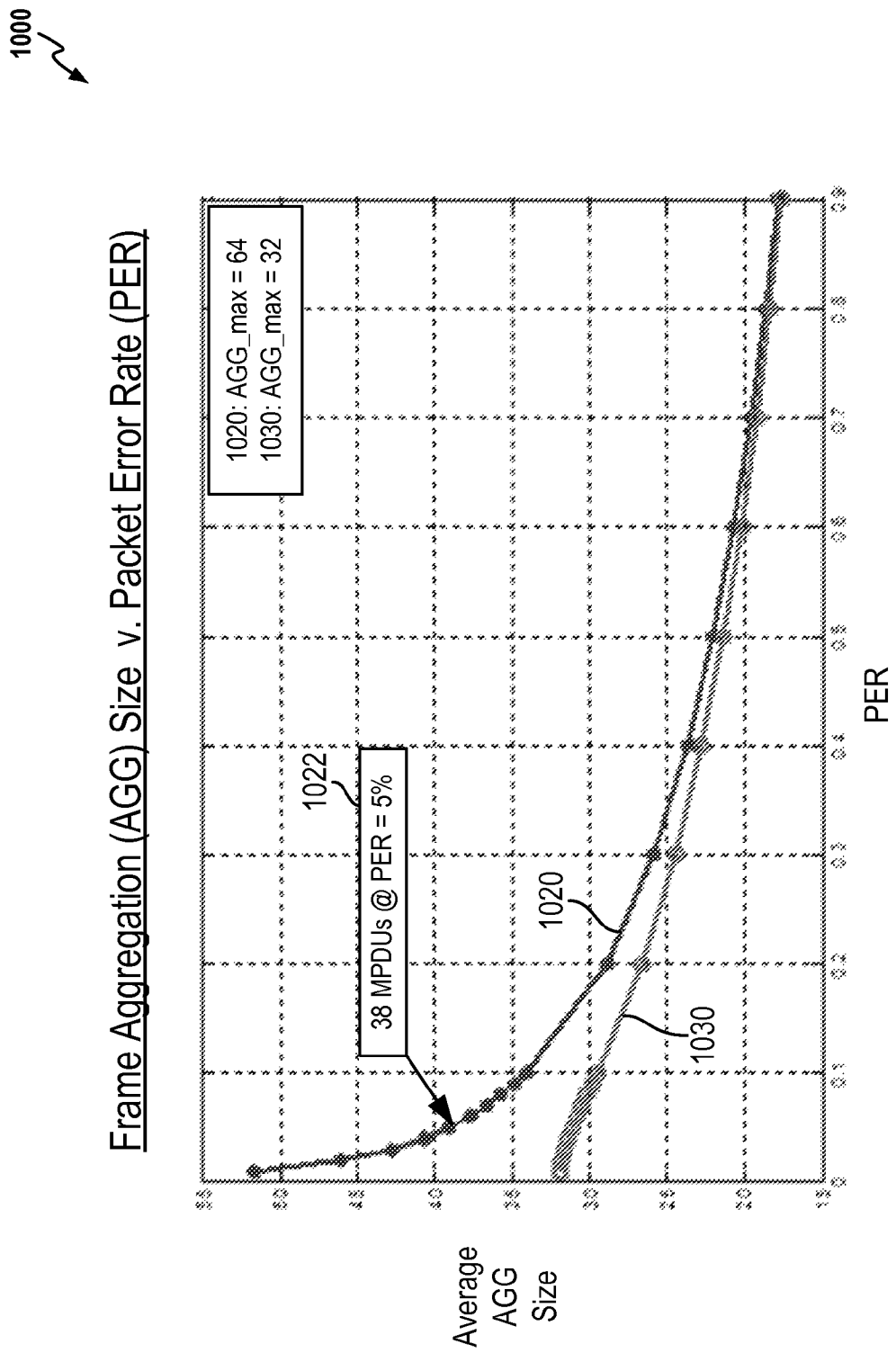
FIG. 10 is a plot illustrating a relationship between aggregation size as a function of PER for two example aggregation sizes.

For example, FIG. 10 illustrates an effect on aggregation size in view of various levels of PER in a plot 1000, for a series of AMPDU frame transmissions sent using a particular communications profile. A first curve 1020 illustrates an effect that PER has on an average frame aggregation size, also referred to herein as an effective aggregation size (AGG) size of a series of aggregate frame transmissions using a BA window size of 64 MPDUs, while a second curve 1030 illustrates an effect that PER has on a BA window size of 64 MPDUs. As can be seen by examining the first curve 1020, even where PER is as small as 5% (0.05) at a plot location 1022, average aggregation size drops from a value of 64 MPDUs to approximately 38 MPDUs. The problem becomes more severe with very high PHY data rates, such as in WLANS implementing the IEEE 802.11ac standard, where large aggregate size is desired. As a result, existing algorithms overestimates goodput for any communications profile where there is non-zero PER and tends to pick a communications profile with a higher possible data rate than is optimal.

As a specific example of the above issue and to further illustrate how aggregation size has a direct impact on MAC efficiency and, consequently, throughput, reference is made to a table 1100 in FIG. 11 that illustrates a UDP saturated throughput with for two example communications profiles referred to as MCS8 and MCS9. As used herein, a communications profile with a higher number may indicate that a higher maximum theoretical throughput may be achieved by that communications profile as compared to another communications profile with a lower number. A "MCS9 Zero PER" column 1130 lists a maximum theoretical throughput, assuming a zero PER (i.e., no errors), for each corresponding aggregation size for the MCS9 communications profile, while a "MCS8 Zero PER" column 1160 lists a maximum theoretical throughput for the MCS8 communications profile under the same assumptions. For example, for a frame aggregation size of 64, the communications profile MCS9 may achieve a maximum theoretical throughput of 912 Mbps. Each communications profile MCS9 and MCS8 has an associated "Peak*(1−PER)" column 1140, 1170 that lists a traditional theoretical throughput determination based on an associated maximum theoretical throughput as reduced by a corresponding PER using the formula discussed above, which assumes maximum aggregation over all transmissions (e.g., 64 MPDUs). The traditional theoretical throughput is typically used in existing rate control algorithms.

However, as discussed herein, simply because one communications profile has a higher theoretical maximum throughput does not mean that a communications profile with a lower theoretical maximum throughput may not be a better choice under certain conditions. For example, reference is made to a pair of "PER & AGG Considered" columns 1150, 1180 associated with MCS9 and MCS8 communications profiles, respectively, that shows the actual, or expected throughput achievable by each communications profile when effective aggregation size, shown in a "AGG" column 1120, as a function of PER, shown in a "PER" column 1110 is considered in accordance with various aspects of the disclosure for rate control.

It is seen that a rate control algorithm that does not consider the aggregation factor will choose the non-optimal rate. For example, in a scenario where MCS8 has 0 PER and MCS9 has 0.05 PER:

Without consideration of aggregation impact:
MCS9: 866.4/MCS8: 842->choose MCS9: Achieved throughput: 735 Mbps; and With consideration of aggregation impact:
MCS9: 735.3/MCS8: 842->choose MCS8: Achieved throughput: 842 Mbps.

The various aspects of the disclosure are described using examples in which a predicted transmission rate for a particular communications profile may be determined based at least in part on frame aggregation characteristics as a function of a PER for each transmission over a communications link between a transmitting device and a receiving device. For example, an effective frame aggregation window size may be determined for each level of PER that may be experienced by a series of frame transmissions from the transmitting device over the communications link. The frame aggregation window size refers to the number of data units that may be included in an aggregated frame. The determination of the PER may include consideration of a receipt of a BA frame, also referred to herein as a BA frame, from the receiving device for each frame transmission. The effective frame aggregation window size and the PER may be used by a rate control module on the transmitting device to determine a predicted transmission rate associated with the communications profile from which the PER and other measured parameters are determined. The communications profile is part of the set of communications profiles, where each communications profile is associated with a potential transmission rate, also referred to as an expected throughput. An appropriate physical layer (PHY) transmission rate for the communications channel may then be achieved by an appropriate selection of a communications profile from the set of communications profiles. The PHY transmission rate may be selected based on optimizing overall throughput resulting from different frame aggregation window sizes as a function of various PERs for various PHY transmission rates.

FIG. 1 is a system 100 illustrating an example aspect of rate control based on frame aggregation feedback. A device initially referred to as a transmitter such as a first device 110 includes a MAC layer 102, a PHY controller 104, and a network interface 106. The network interface 106 is capable of being coupled to a communications channel 115, which may be referred herein as a communications link. The communications channel may be wireless or wireline. In one example, the communications channel 115 is a WLAN wireless channel configured for IEEE 802.11e, IEEE 802.11n, IEEE 802.11ac or other types of WLAN protocols that utilize frame aggregation techniques. The MAC layer 102 includes functionality to implement frame aggregation and allows an AMPDU frame to be transmitted via the network interface 106.

The system 100 may include another device initially referred to as a receiving device such as a second device 120 that also has a network interface 124 and PHY/MAC protocols 126. The second device 120 includes a block acknowledgement module 128 configured to send a BA frame to the first device 110 to indicate acknowledgement/non-acknowledgement (ACK/NAK) for a series of MPDUs included in the AMPDU frame transmitted from the first device 110 to the second device 120.

First device 110 also includes a rate control module 108. In a traditional device, the rate control module may adjust the PHY transmission rate based on channel conditions, such as bit error rate (BER), signal to noise ratio, or power limitations. The rate control module can adjust the modulation and coding scheme (MCS) used over the communications channel 115. For example, different MCS may be associated with different data transmission rates. MCS involves the coding of data into symbols in a modulation scheme. A greater number of symbols may allow for a greater number of bits to be represented by each symbol. Therefore, a higher MCS indicates modulation using greater numbers of bits for each symbol. A higher MCS is associated with a higher PHY transmission rate since more data can be communicated in each transmission.

In accordance with this disclosure, the rate control module 108 is configured to determine an effective transmission rate associated with a communications profile in a set of communications profiles based at least in part upon the frame aggregation efficiency as a function of the PER from a previous transmission. The set of communications profiles may be updated after each frame transmission and receipt of a BA resulting therefrom, which will result in each communications profile having a different effective transmission rate. The communications profile may then be selected based on the one with the highest associated effective transmission rate. For example, if a higher MCS results in greater PER then the effective frame aggregation window would be smaller. A smaller frame aggregation window may limit throughput of MPDUs for the higher MCS, resulting in a communications profile with a lower effective throughput parameter, as further described herein. Alternatively, the rate control module 108 may select a different communications profile having a different communications parameter such as a lower MCS where, even though the lower MCS may result in a lower bit rate, the lower MCS may support a larger frame aggregation window as a function of the PER. The larger frame aggregation window can reduce PHY overhead and improves the frame aggregation efficiency of the communications channel. This disclosure includes various alternatives for determining an optimal communications profile to use based on an effective throughput value (transmission rate) based upon the frame aggregation feedback as a function of the PER.

Having described the structural and logical components of the system 100 in FIG. 1, various example operations are now described with respect to the system 100. In addition to faster transmission rates, improvements in MAC protocols have also increased throughput. For example, reducing MAC protocol overhead has shown to improve throughput in communications systems. For example, frame aggregation is a process of arranging several MAC protocol data units (MPDUs) together into a single PHY transmission frame. Having fewer PHY transmission frames is preferable in some communications systems that require a contention process between PHY frames, interframe spacing, or PHY transmission frame headers because these mechanisms all introduce overhead. Thus, being able to transmit the same number of MPDUS in fewer PHY frames theoretically results in lower overhead.

At stage A, the first device transmits a first quantity of MPDUs using frame aggregation. The quantity of MPDUs is included in an AMPDU transmission from the first device 110 to the second device 120 via the communications channel 115. The first device 110 may be referred to as a transmitting device, transmitter, or an originator for this example. The second device 120 may be referred to as a receiving device, receiver, or recipient for this example. In one aspect of the disclosed approach, the MAC layer 102 of the first device 110 is configured to implement the frame aggregation based on MAC protocol data units. In an example, the AMPDU transmission may include 64 MPDUs in the single AMPDU PHY-level frame.

Further improvements to throughput may be possible in communications systems that employ frame aggregation feedback in the form of block acknowledgements. Block acknowledgment is a mechanism that allows a receiver to acknowledge receipt of multiple MPDUs (associated with frame aggregation) in a single block acknowledgement message to a transmitter. The transmitter, having received this feedback, is able to determine a variety of information about the communications channel. The transmitter may then select a different communications profile using which it may transmit additional frames.

At stage B, the second device sends a BA message indicating which MPDUs failed. The BA frame may be generated by a BA Module 128 of the second device 120. Alternatively, the BA frame may be generated by a communications unit, network interface component, processor, or other suitable components of the second device 120.

In some aspects of the disclosed approach, the BA frame is responsive to a BA request (BAR) frame from the first device 110 to the second device 120. In other aspects of the disclosed approach, the second device 120 may be configured to automatically send a BA frame for each AMPDU transmission that the second device 120 receives. The BA frame includes a bitmap in which each bit represents an acknowledgement (ACK) or non-acknowledgement (NAK) of one of the MPDUs in the AMPDU transmission. For example, the bitmap may be 64 bits long, each bit representing one of the 64 MPDUs that was included in the received AMPDU transmission. A zero ("0") value may indicate a non-acknowledgement, such as a failure to decode the MPDU. For example, the MPDU frame check sequence may not match the contents of the decoded MPDU. Alternatively, a missing MPDU may be detected based upon a missing sequence number. For example, each MPDU in the AMDPU transmission may be associated with a sequence number. The second device 120 may determine that a MPDU was not properly received if there is a skipped (i.e. "hole") in the sequence numbers of the MPDUs that are decoded from the AMPDU transmission.

At stage C, the transmitter such as the first device may select a communications profile based at least in part on a determined effective aggregation as a function of a measured PER. The first device may also select a communications profile based on an expected throughput, also referred to as an expected transmission rate, associated with the communications profile, where the expected throughput is determined based on an effective aggregation as a function of a measured PER.

As an example, at stage C1, the transmitter may select a communications profile based on an expected transmission rate for that communications profile based on a determined PER and an effective aggregation based on the determined PER. In accordance with various aspects of the disclosed approach, a frame aggregation shift parameter indicates a change in the frame aggregation window size associated with the failed MPDU in the BA frame (i.e., a function of the PER). Using the example in FIG. 1, if the first AMPDU included 64 MPDUs and the BA frame indicates that the first MPDU failed, then the next AMPDU transmission would only include one MPDU (even if all the other 63 MPDUs were successfully received). For example, the next AMPDU transmission may include a retry attempt to send the missing MPDU in a smaller AMPDU transmission. Since only one MPDU would be included in the subsequent AMPDU, the frame aggregation shift parameter would be 63 (i.e., changing the AMPDU window size from 64 to 1 represents a shift of 63 units). If the BA frame indicates that the tenth MPDU failed, then the next AMPDU transmission would normally only includes ten MPDUs and the frame aggregation shift parameter would be 54 (i.e., changing the AMPDU window size from 64 to 10 represents a shift of 54 units).

Although the frame aggregation shift parameter and the frame aggregation window size may settle into an average value based on a particular PER, in one aspect of the disclosed approach an effective aggregation value may be determined based on each PER for a variety of communications profiles. Thus, a table of communications profiles associated with an expected or effective aggregation value as a function of PER may be created. Further, as each communications parameter may include an expected, or theoretical (i.e., where PER=0), throughput value, the table may also include a throughput metric that is an adjusted value based on the expected throughput value. In accordance with various aspects of the disclosed approach, effective throughput may be defined as:

$$THROUGHPUT_{EFFECTIVE} = (1-PER)*THROUGHPUT_{THEORETICAL}(AGG)$$

where AGG is the effective aggregation as a function of the PER, $THROUGHPUT_{THEORETICAL}$ is the theoretical throughput rate, or value, and $THROUGHPUT_{EFFECTIVE}$ is the expected throughput rate, or value, after $THROUGHPUT_{THEORETICAL}$ has been adjusted based on the formula.

As a further example, at stage C2, the transmitter may select a communications profile based at least in part on a likely throughput rate determined based on an effective aggregation as a function of a PER. Typically, a PER represents a ratio of failed MPDUs to the number of MPDUs included in the AMPDU. For example, if 1 MPDU failed out of an AMPDU that includes 64 MDPUs, then the PER would be relatively low (1/64). However, in accordance with this disclosure, the PER may be adjusted to indicate a higher PER when the frame aggregation window size is decreasing. Similar to the frame aggregation shift parameter described herein, the frame aggregation window size is responsive to at least the lowest indicated MPDU failure in the BA frame. In an example in this aspect, the PER may be increased in proportion to the frame aggregation shift parameter. A larger frame aggregation shift parameter would result in a higher adjusted PER.

The elements illustrated in the communications scenario 100 may be implemented in different ways in different applications. For example, the various aspects of the approach described herein may be implemented in a system where components are attached to one another (e.g., where components are interconnected by wires) or in a system where components are detached from one another (e.g., a wireless system). Also, the various aspects of the approach herein may be employed in conjunction with processing of various types of information. For example, in some implementations this information may comprise control information that may be used to control certain operations at different components. In some implementations this information may comprise data such as audio data, video data, sensor data, or gaming data.

The adjustment of the expected throughput may be useful in a device that uses the expected throughput to determine the selection of the communications profile associated with the expected throughput, and correspondingly, resulting in an associated effective transmission rate. For example, a high PER may be associated with a smaller effective aggregation, which results in the associated communications profile having a lower MCS. A rate control module that is already configured to utilize a PER may be used in accordance with this disclosure. For example, the adjusted expected throughput may be calculated based on the frame aggregation feedback and the PER provided to a rate control module. By adjusting the expected throughput based on the effective aggregation as a function of the PER determined from the frame aggregation feedback, the rate control module will choose a communications profile with an associated effective transmission rate that is based at least in part on the frame aggregation feedback.

In accordance with various aspects of the disclosed approach, the PER may be adjusted such that the effective aggregation may be a function of a changing PER. For example, an average PER value that is determined using a number previously reported PERs may be used as the PER to determine an effective aggregation size. In one aspect of the disclosed approach, the PER may be a moving average or weighted based on a series of PER calculations.

In one aspect of the disclosure, the rate control module 108 may utilize existing algorithms for selecting a communications profile based on the effective aggregation as a function of the PER. For example, the rate control module 108 may decrease the transmission rate (using a lower MCS) if the effective aggregation as a function of the PER is below a predefined threshold. Because the effective transmission rate for a particular effective aggregation as a function of the PER is penalized greater for higher PERs, the rate control module 108 may use a communications profile that has a lower theoretical transmission rate. However, the communications profile may provide more reliable communications to support greater effective frame aggregation window sizes. In other words, frame aggregation efficiency may be improved for the communications profile with the lower theoretical transmission rate due to a lower PER that may be experienced for transmissions using the more robust communications parameters in the selected communications profile. Therefore, the actual, effective data throughput rate for the selected communications profile may be higher than other communication profiles with higher theoretical transmission rates.

The efficiency of frame aggregation decreases as PER increases. For example, when the PER is only 5% the aggregation size is dropped from 64 MPDUs to 38 MPDUs in the AMPDU window size. The effect of PER on aggregation size is more pronounced for higher PHY data rates. While aggregation size is more efficient at the higher PHY data rates, small increases in PER may have dramatic effects. Therefore, by adjusting the expected throughput for an associated communications profile based on the effective aggregation as a function of the PER or by taking into account the aggregation size in the selection of a communications profile to reach an expected transmission rate, the efficiency of the communications channel may be improved.

Empirically, a communications channel having −81 dBm attenuation may have random holes in the frame aggregation mechanism when using Modulation Coding Scheme 7 (MCS7). The same communications channel may have relatively fewer frame aggregation holes when using Modulation Coding Scheme 5 (MCS5). In one example, the rate control module may use the unadjusted PER (e.g. not using an adjustment that is based on the frame aggregation shift parameter) to determine the transmission rate. The rate control module may select MCS7 based on the unadjusted PER. However, the use of MCS7 may yield poor throughput due to BA holes in the frame aggregation feedback causing smaller frame aggregation window sizes. In another example, the rate control module may use the adjusted PER which incorporates an adjustment based on the frame aggregation shift parameter. In other words, the adjusted PER may be higher if the frame aggregation shift is higher. In this example, the rate control module may select MCS5 based on the adjusted PER value. Comparing the two examples, the overall throughput for MCS7 may be found to be 540 mps throughput for User Datagram Protocol (UDP) traffic using frame aggregation, while the overall throughput for MCS5 may be found to be 602 mps throughput for the same UDP traffic using frame aggregation. Therefore, in accordance with the PER calculations in this disclosure, the lower transmission rate (MCS5) may be selected.

Figure 2:
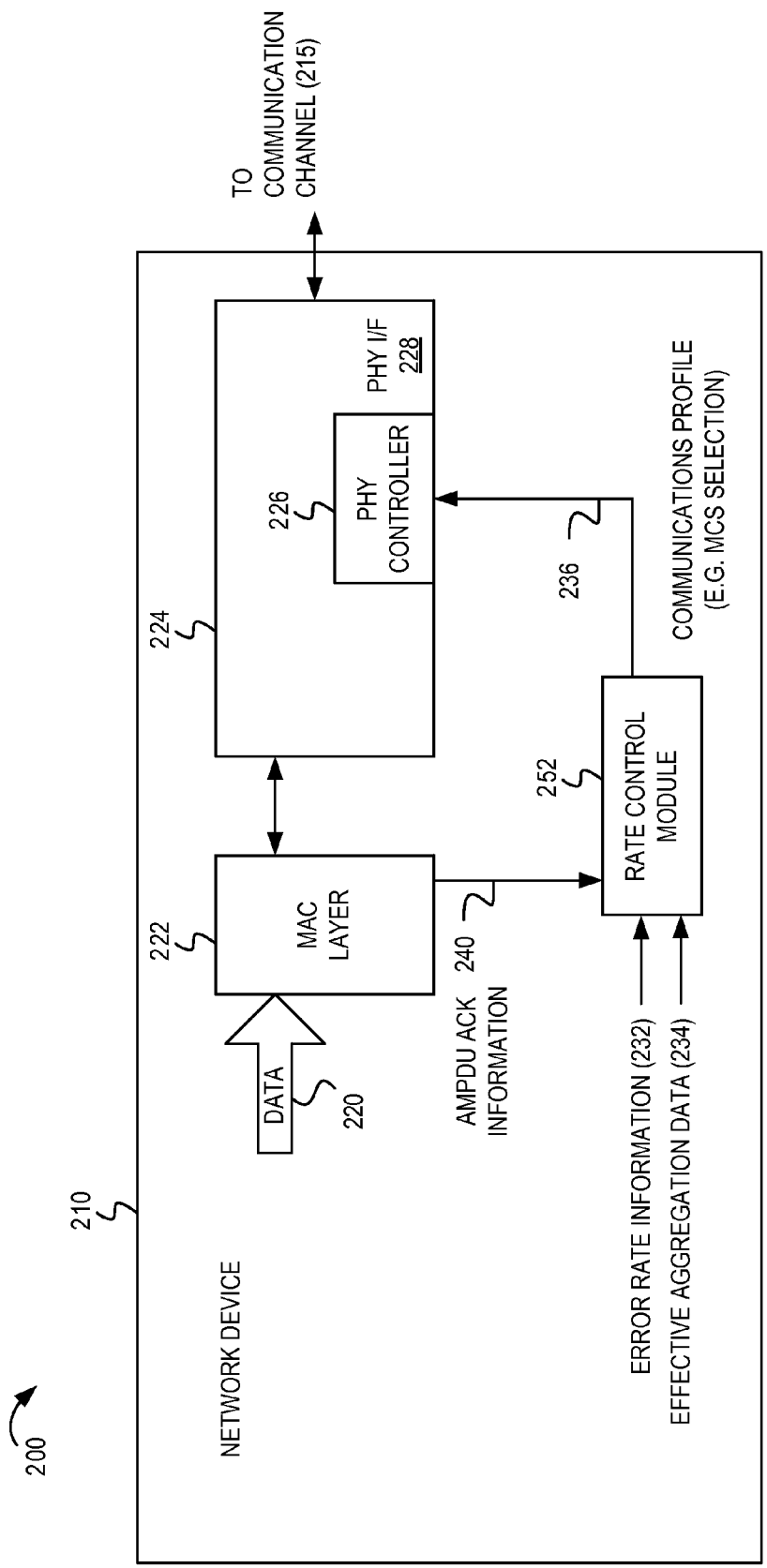
FIG. 2 is diagram illustrating an example network device having a rate control module configured in accordance with various aspects of the disclosed rate control approach for rate control while accounting for effective aggregation.

FIG. 2 is a block diagram 200 illustrating an example network device 210 having a rate control module 252 in accordance with various aspects of the disclosed approach of the present disclosure. In some implementations, data 220 to be transmitted can be received by MAC layer 222. MAC layer 222 can provide a data interface between components and modules within network device 210 and the communications channel 215 through PHY layer 224. Data from MAC layer 222 can be processed by the PHY layer 224 and transmitted via a physical interface 228 capable of coupling to the communications channel 215. A PHY controller 226 may manage modulation, forward error correction, or other physical layer transmission properties for the physical layer 224.

A rate control module 252 can provide, based on a chosen communications profile, PHY settings (shown as arrow 236) to the PHY controller 226 in PHY layer 224. The provided PHY settings can include an initial transmission rate setting as described in stage C above. In one aspect, PHY controller 226 can determine modulation characteristics for data to be transmitted into communications channel 215 based upon the PHY settings 236. PHY layer 224 can transmit data from MAC layer 222 at the data rate determined by rate control module 252 via the communications channel 215.

The rate control module 252 may include inputs such as an error rate information input 232 for receiving communications error parameters, or error metrics, such as BER or PER. The rate control module 252 may also include inputs such as an effective aggregation data input 234. In accordance with an aspect of the disclosure, the rate control module 252 may also receive AMPDU acknowledgement information 240 from the MAC layer 222. For example, the frame aggregation feedback in the BA frame may be converted to a frame aggregation shift parameter or block acknowledgement window size based upon the position of a first hole in the BA frame.

Because the rate control module 252 is responsive to frame aggregation feedback information as a function of the PER, in one aspect of the disclosure the rate control module 252 may determine a PHY settings 236 using a communications profile selected based upon an expected throughput as determined using the effective aggregation as a function of the PER, as described herein.

If the impact of aggregation is accounted for in a rate control algorithm as described herein, a goodput table may be created as follows, where for each MCS, where the MCS may correspond to a communications profile as discussed herein, there is an estimated or expected throughput based on the determination described above for $THROUGHPUT_{EXPECTED}$. In accordance with various aspects of the disclosed approach, the communications profile with the best goodput may be selected as shown in the table below.

TABLE

| Sample Rate Control Table | | | | | |
|---|---|---|---|---|---|
| MCS | PER | AGG (Effective Avg.) | peak_udp_thuput | Peak * (1 − per) | AGG Considered |
| 9 | 0.05 | 38 | 912 | 866.4 | 735.3 |
| 8 | 0 | 64 | 842 | 842 | 842 |
| 7 | ... | ... | ... | ... | ... |
| ... | | | | | |

Figure 3:
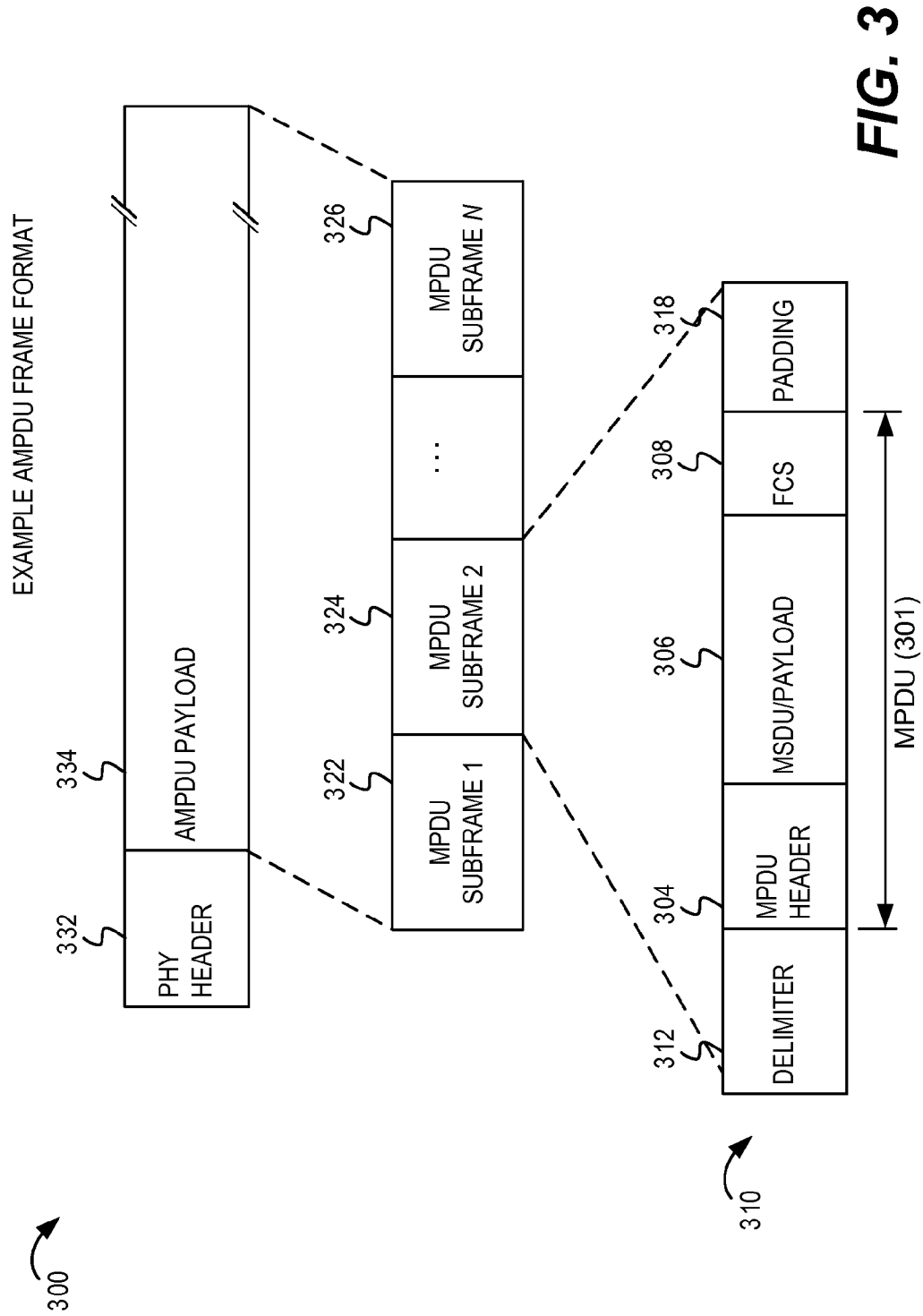
FIG. 3 is a block diagram illustrating an example AMPDU frame format configured in accordance with various aspects of the disclosed rate control approach.

FIG. 3 is a diagram illustrating an example AMPDU frame format 300 in accordance with various aspects of the disclosure. The AMPDU frame format 300 may include a PHY header 332 portion and an AMPDU payload 334 portion. The AMDPU payload 334 includes a plurality of MPDUs. The MPDUs are structured as MPDU subframes, such as an MPDU subframe "1" 322, an MPDU subframe "2" 324, and an MPDU subframe "N" 326, within the AMPDU payload 334. Each MPDU subframe may have a structure similar to an example MPDU subframe structure 310 illustrated for MPDU subframe "2" 324. The example MPDU subframe structure 310 includes a delimiter field 312, an MPDU 301 portion, and padding 318. The MDPU 301 may include an MPDU header 304, a payload 306 portion, and a frame check sequence (FCS) field 308. The payload 306 may include a MAC service data unit (MSDU). It should be understood that the quantity of MPDU subframes included in the AMPDU frame may be variable. In accordance with some WLAN implementations, the quantity of MPDU subframes may be limited to a maximum of 64 units. Furthermore, the quantity of MPDU subframes may be selectable from fixed predetermined quantities (e.g., 1, 2, 4, 8, 16, 32, or 64).

Figure 4:
FIG. 4 is a block diagram illustrating an example block acknowledgement frame format configured in accordance with various aspects of the disclosed rate control approach.

FIG. 4 is a diagram illustration an example BA frame 400 in accordance with various aspects of the disclosure. The BA frame 400 may include a PHY frame header field 432, a BA control field 434 and a BA information field 436. The BA control field 434 may provide information regarding the size or structure of the BA information field 436. In one example, the BA information field 436 may include a BA starting sequence control field 422 and a BA bitmap 424. The BA starting sequence control field 422 includes a value to indicate a first, or starting sequence number of the MPDUs being acknowledged by the BA frame 400. The BA bitmap 424 may include one or more bits for each MPDU acknowledged (or non-acknowledged) in the BA frame 400. FIG. 8 includes examples of bitmaps that may be included in the BA bitmap field 424 of a BA frame using compressed block acknowledgement.

Figure 5:
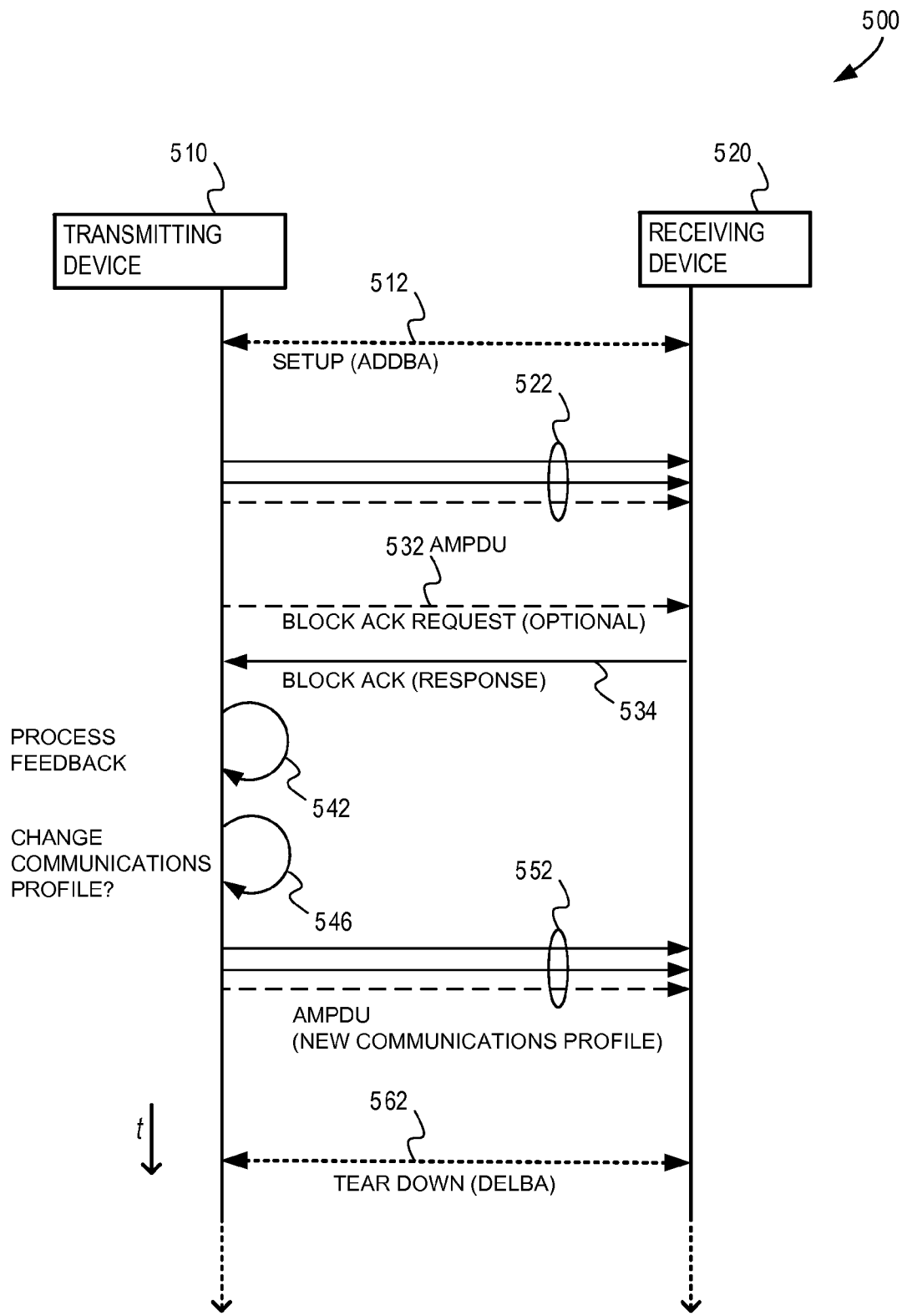
FIG. 5 is a message flow diagram illustrating a frame aggregation, frame aggregation feedback, PER determination, effective aggregation as a function of the PER, and rate control in accordance with an aspect of the present disclosure.

FIG. 5 is a message flow diagram 500 illustrating a frame aggregation transmission, a frame aggregation feedback transmission, and rate control operation configured in accordance with an aspect of the disclosed approach. In the message flow diagram 500, a first device is defined as a transmitting device 510 and a second device is defined as a receiving device 520. It should be understood that the transmitting device 510 is capable of both transmitting and receiving messages. Similarly, the receiving device 520 is capable of both transmitting and receiving messages. However for purposes of this example diagram, the transmitting device 510 has data which is to be transmitted to the receiving device 520 via a communications channel.

The transmitting device 510 and receiving device 520 are coupled via a communications channel that supports frame aggregation. Block acknowledgement may be used with the frame aggregation to improve the efficiency of the communications channel. Block acknowledgement consists of a setup and a tear-down phase. In the setup phase, capability information such as buffer size and BACK policy are negotiated with the receiver.

At 512, the transmitting device 510 and receiving device 520 may exchange messages to negotiate or setup a block acknowledgement scheme. For example, the transmitting device 510 may send a BA setup message (referred to as "ADDBA") to the receiving device 520 and wait for an acknowledgement from the receiving device 520 before determining that the block acknowledgement scheme is activated. The ADDBA message may also include a block acknowledgement policy. For example, a parameter may indicate the type of block acknowledgement scheme requested (e.g. immediate BA, delayed BA, or normal BA), or whether compressed BA is permitted.

At 522, the transmitting device 510 may transmit an AMPDU frame to the receiving device 520. The AMPDU frame may include a plurality of MPDUs. For example, the AMPDU frame may be formatted similar to the example AMDPU frame described in FIG. 3.

At 532, the transmitting device 510 may send a BA Request (BAR) frame to the receiving device 520 to request acknowledgement of the MPDUs included in the AMPDU frame.

The transmitting device 510 may include a block acknowledgement starting sequence control value in the BAR frame to signal the first MPDU in the block for which an acknowledgment is expected. MPDUs in the receiving device's 520 buffer with a sequence control value that precedes the starting sequence control value may be called preceding MPDUs. The receiving device 520 may reassemble any complete MSDUs from buffered preceding MPDUs and indicate these to its higher layer. The receiving device 520 may maintain a block acknowledgement record consisting of originator address, TID, and a record of reordering buffer size indexed by the received MPDU sequence control value. This record holds the acknowledgment state of the data frames received from the transmitting device 510.

At 534, the receiving device 520 may respond with a BA frame. For example, the BA frame may be formatted similar to the example BA frame described in FIG. 4. For example, the receiving device 520 may respond with a BA frame. The BA frame includes acknowledgments for the MPDUs of up to 64 previous MSDUs. In the BA frame, the receiving device 520 acknowledges only the MPDUs starting from the starting sequence control until the MPDU with the highest sequence number that has been received, and the receiving device 520 may set bits in the BA bitmap corresponding to all other MPDUs (not received) to zero. At 542, the transmitting device 510 may process the BA frame to determine, among other characteristics, a frame aggregation shift parameter. The frame aggregation shift parameter may be associated with a position of the first hole in the BA bitmap. The frame aggregation shift parameter may be a value associated with changing the frame aggregation window size for a subsequent AMPDU frame. If the transmitting device 510 receives a BA frame, the transmitting device 510 processes the basic BA frame (at 542) to update its own record. The transmitting device 510 may retry transmitting any frames that are not acknowledged in the BA frame, either in another block or individually. For example, if the BA frame indicates that an MPDU was not received correctly, the transmitting device 510 may retry that MPDU, subject to that MPDU's appropriate lifetime limit.

At 546, the transmitting device 510 may determine whether to change the communications profile associated with an expected transmission rate based at least in part upon the frame aggregation shift parameter as a function of the PER. For example, the transmitting device 510 may compare the frame aggregation efficiency associated with a first option (e.g., using the current communications profile and a frame aggregation window size reduced by the frame aggregation shift parameter and PER) with the frame aggregation efficiency of a second option (e.g., using a different communications profile with less or no reduction in the frame aggregation window size). In accordance with an aspect of this disclosure, the transmitting device 510 selects a different communications profile associated with an expected transmission rate based on a probability for greater throughput resulting from the change in expected transmission rate.

It should be understood that in some aspects of the disclosed approach, the transmitting device 510 communicates the change in communications profile to the receiving device 520 prior to transmitting frames using the new communications profile. In some aspects of the disclosed approach, the PHY header of a subsequent frame may indicate the new communications profile. In other aspects of the disclosed approach, a separate message may be transmitted to indicate the change in communications profile to the receiving device 520.

At 552, the transmitting device 510 transmits a subsequent AMPDU frame using the new communications profile. In some aspects of the disclosed approach, the quantity of aggregated MPDUs may be the same as the quantity of MPDUs included in the previous AMPDU frame, e.g., when the BA bitmap of the transmitting device 510 previous aggregate indicated all MPDUs acknowledged, or all retransmit attempt to previously failed MPDUs failed and transmitter starts with new AMPDU.

At 562, the block acknowledgement session may be terminated using a tear down process. For example, a tear down message (referred to as "DELBA") may be used to communicate the end of the block acknowledgement session.

Figure 6:
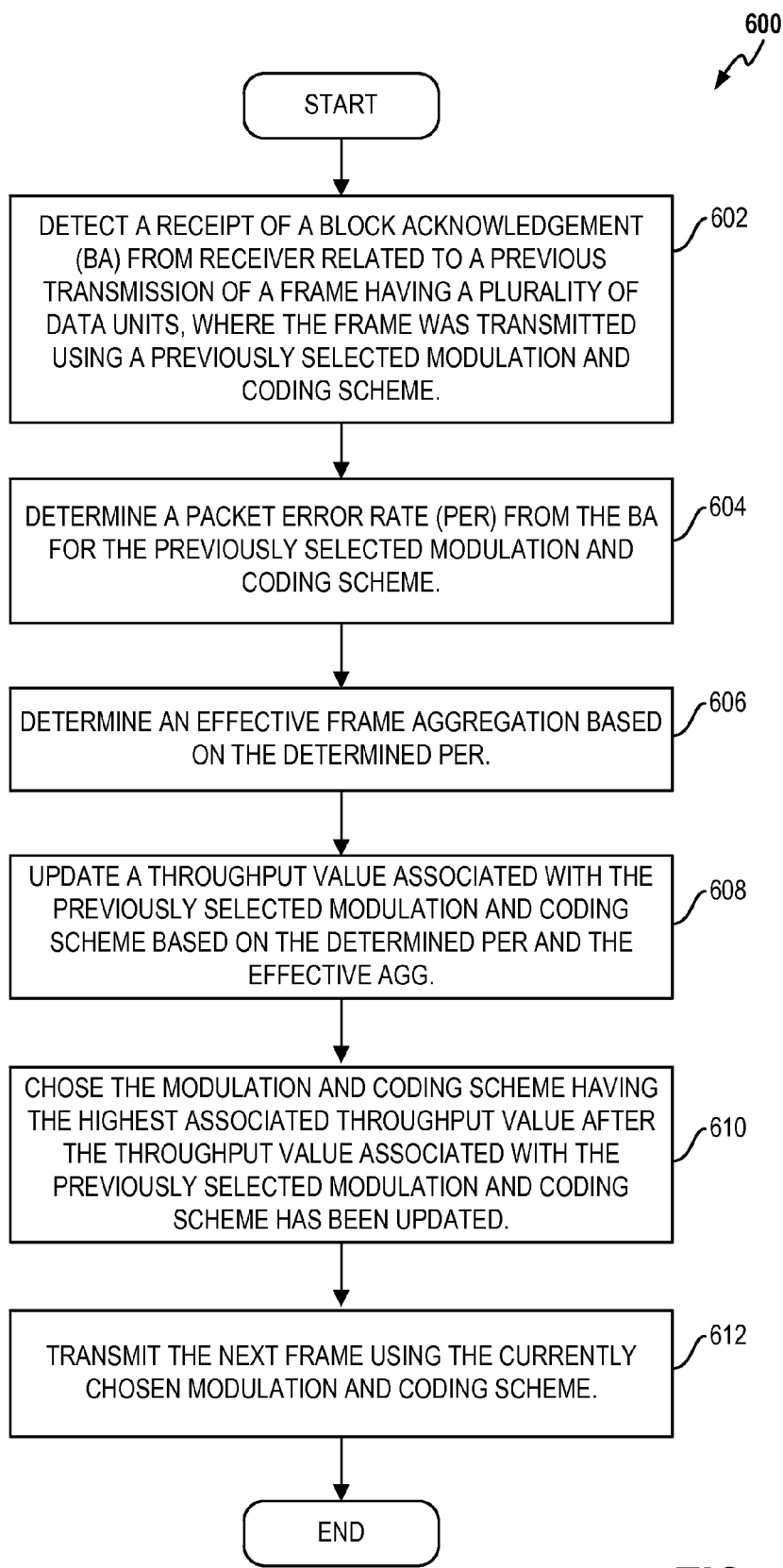
FIG. 6 is a flow diagram illustrating a wireless communications process configured to select an MCS for a present frame transmission based on a determined PER, an effective frame aggregation, and a throughput value associated with the MCS.

FIG. 6 illustrates a process 600 where, at 602, a transmitter may receive a BA frame from a receiver related to a previous transmission of a frame having a plurality of data units such as MPDUs. It should be noted that the transmitter may not receive a BA from the receiver for every transmission. For example, the receiver may not send a BA if the receiver did not receive the transmission of the frame from the transmitter. In this case, the transmitter may treat this as a complete failure of transmission of the frame. The frame may have been transmitted by the transmitter using a particular communications profile that was selected from a set of predefined communications profiles. In one aspect of the disclosed approach, communications profiles may be defined by one or more communications parameters such as a modulation and coding scheme MCS. In another aspect of the disclosed approach, communications profiles may be defined by communications parameters such as a MIMO configuration.

At 604, the transmitter may determine a PER from the BA based on the previously selected MCS, where the PER may also be referred to as a communications error parameter as discussed above.

At 606, the transmitter may determine an effective aggregation based on the determined PER. In one aspect of the disclosed approach, the aggregation may be based on a look-up table or a function, such as that illustrated by the plot 1000 in FIG. 10.

At 608, the transmitter may update an expected throughput for the communications profile used in the previous transmission discussed at 602 based on the determined PER and the effective aggregation, as discussed herein with reference to table for the sample rate control table discussed above.

At 610, the transmitter may choose a communications profile from the set of predefined communications profiles having the highest associated throughput parameter. In one aspect of the disclosed approach, the transmitter may choose an MCS based on the aforementioned effective throughput determined based on the effective aggregation as a function of PER.

At 612, the transmitter may transmit a second frame with one or more data units based on the selected MCS.

Figure 7:
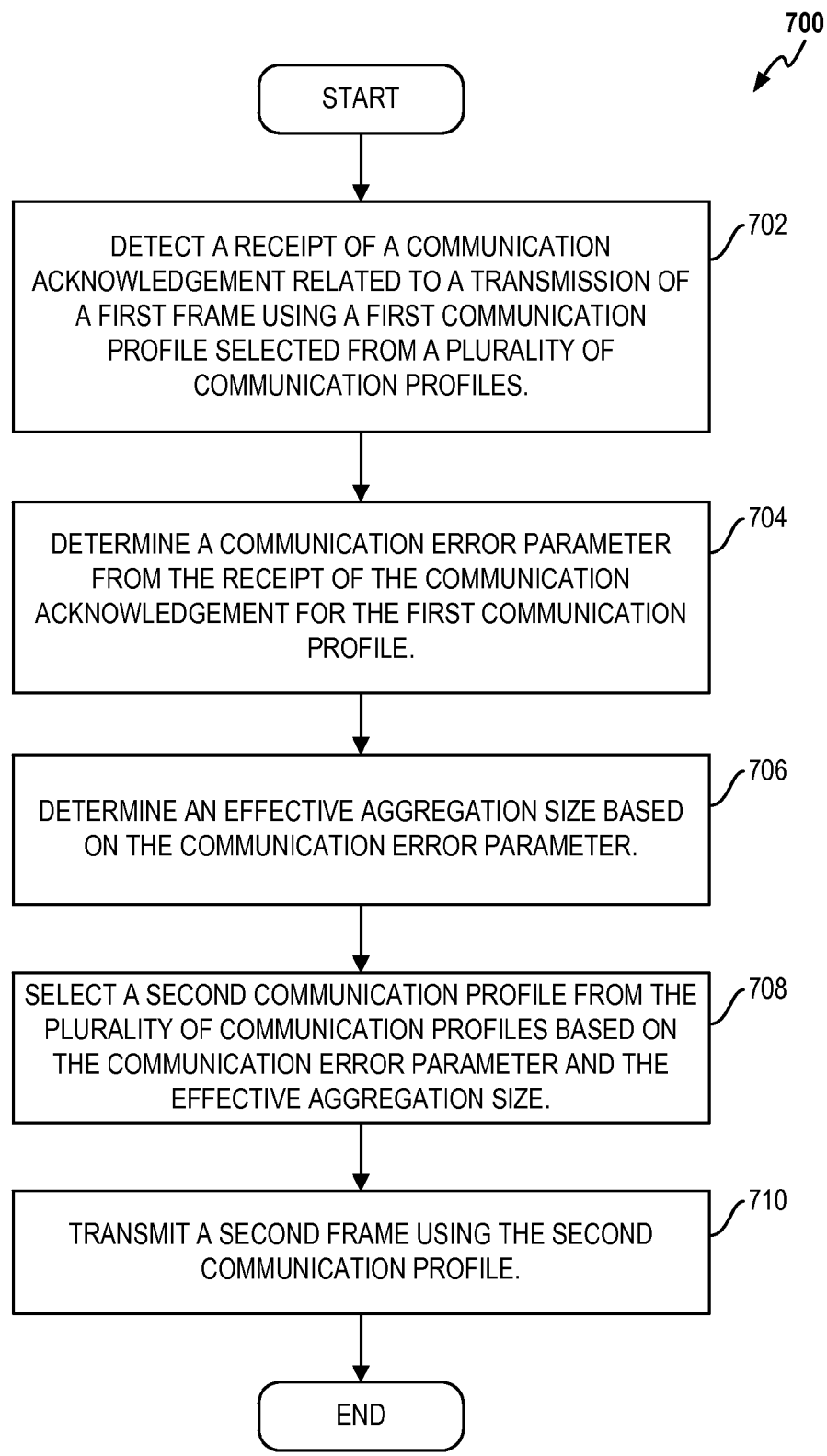
FIG. 7 is a flow diagram illustrating a wireless communications process configured to select a communications profile for a present frame transmission based on a determined communications error parameter, and an effective aggregation size.

FIG. 7 illustrates a process 700 for rate control configured in accordance with another aspect of the disclosed approach where, at 702, the transmitter receives a communications acknowledgment related to a transmission of a first frame using a first communications profile selected from a plurality of communications profiles. In one aspect of the disclosed approach, the communications acknowledgment may be a BA frame. Further, each communications profile in the plurality of communications profiles may be associated with a particular modulation and coding scheme.

At 704, the transmitter may determine a communications error parameter from the communications acknowledgement for the first communications profile.

At 706, the transmitter may determine an effective aggregation size based on the communications error parameter.

At 708, the transmitter may select a second communications profile from the plurality of communications profiles based on the communications error parameter and the effective aggregation size.

At 710, the transmitter may transmit a second frame using the second communications profile.

In some implementations, a WLAN includes various devices that are the components that access the wireless network. For example, there may be two types of devices: access points ("APs") and clients (also referred to as stations, or "STAB"). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a WiFi (e.g., IEEE 802.11 protocol) compliant wireless link to obtain general connectivity to the Internet or to other wide area networks. In some implementations, an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

A wireless device such as any one of the wireless devices described herein may communicate via one or more wireless communications links that are based on or otherwise support any suitable wireless communications technology. The wireless device may thus include either an AT and/or an AP, as broadly defined herein. For example, in some aspects of the disclosed approach, a wireless device may associate with a network. In some aspects the network may comprise a local area network or a wide area network. A wireless device may support or otherwise use one or more of a variety of wireless communications technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communications links using the above or other wireless communications technologies. For example, a device may comprise a wireless transceiver with associated transmitter and receiver components that may include various components (e.g., signal generators and signal processors) that facilitate communications over a wireless medium. In some aspects the network may comprise a personal area network (e.g., supporting a wireless coverage area on the order of 30 meters) or a body area network (e.g., supporting a wireless coverage area on the order of 10 meters) implemented using ultra-wideband technology or some other suitable technology.

Figure 9:
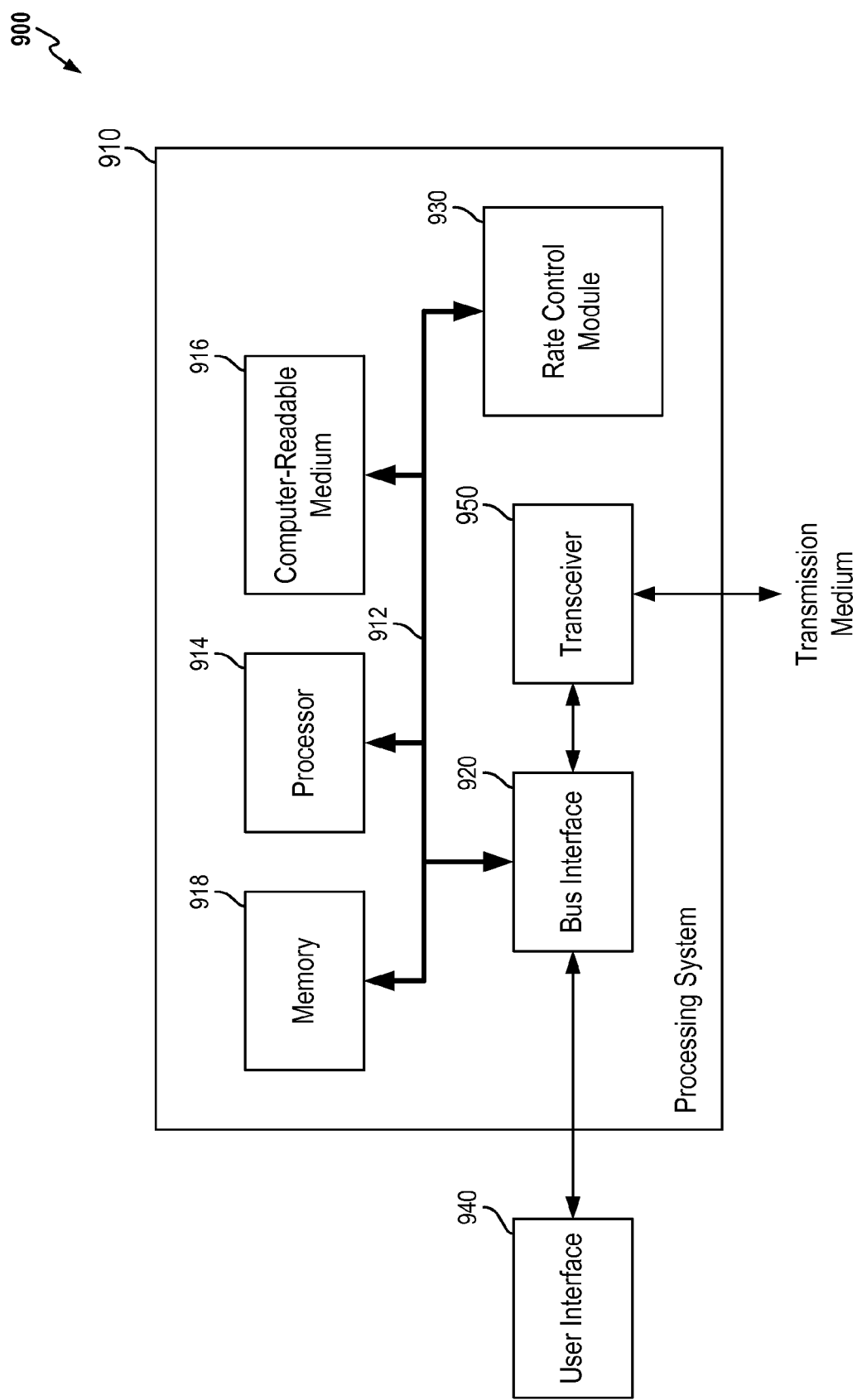
FIG. 9 is a block diagram illustrating an example of a hardware implementation for an apparatus such as a wireless device employing a processing system configured in accordance with various aspects of the rate control approach described herein.

FIG. 9 is a conceptual diagram illustrating an example of a hardware implementation for an apparatus 900 employing a processing system 910 that may be used in accordance with various aspects of the disclosed approach. The apparatus 900 is an example of a device that may be configured to implement the various methods described herein. For example, the apparatus 900 may comprise an AP, a relay, and/or a STA as described above. The processing system 910 includes a rate control module 930 that may be configured in accordance with various aspects of the disclosed approach to perform rate control processes such as those illustrated and described with reference to FIGS. 5-7. For example, the processing system 910 includes one or more processors illustrated as a processor 914. Examples of processors 914 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 910 may be implemented as having a bus architecture, represented generally by a bus 912. The bus 912 may include any number of interconnecting buses and bridges depending on the specific application of the processing system 910 and overall design constraints. The bus 912 links together various circuits including the packet preamble configuration module 930, one or more processors (represented generally by the processor 914), a memory 918, and computer-readable media (represented generally by a computer-readable medium 916). The bus 912 may also link various other circuits such as timing sources, peripherals, voltage regulators, and power management circuits, which are well known in the art, and therefore, will not be described any further. A bus interface 920 provides an interface between the bus 912 and a transceiver 950. The transceiver 950 provides a means for communicating with various other apparatus over a transmission medium.

Depending upon the nature of the apparatus, a user interface 940 (e.g., keypad, display, speaker, microphone, joystick) may also be provided.

The processor 914 is responsible for managing the bus 912 and general processing, including execution of software that may be stored on the computer-readable medium 916 or the memory 918. The software, when executed by the processor 914, causes the processing system 910 to perform the various functions described herein for any particular apparatus. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The computer-readable medium 916 or the memory 918 may also be used for storing data that is manipulated by the processor 914 when executing software. This data may also include any variables or temporary storage values needed for operation of the processing system 900, including any temporary storage needed to create the frames or MPDUs, process block acknowledgements or block acknowledgement requests, determine an effective aggregation or throughput parameters, or determine a PER.

The computer-readable medium 916 may be a non-transitory computer-readable medium such as a computer-readable storage medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. Although illustrated as residing in the processing system 910, the computer-readable medium 916 may reside externally to the processing system 910, or distributed across multiple entities including the processing system 910. The computer-readable medium 916 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In accordance with various aspects of the disclosure, the means for optimizing rate control in accordance with the described aspects of the disclosed approach may comprise wireless devices for wireless communication such as the first device 110 or the second device 120 of FIG. 1, the network device 200 of FIG. 2, or the apparatus 900 of FIG. 9.

The means for detecting a receipt of a communications acknowledgment related to a transmission of a first frame using a first communications profile selected from a plurality of communications profiles may include a receiver. The receiver may comprise the network interface 106 of the first device 110 or the transceiver 950 of the apparatus 900.

The means for determining a communications error parameter from the detection of the receipt of the communications acknowledgement for the first communications profile may comprise a processing system, which may include the processing system 910 of the apparatus 900 and comprise one or more processors such as the processor 914. For example, the processor 914 may be configured with instruction code that may be stored in the memory 918 or the computer-readable medium 916 to determine the communications error parameter. The means for determining may also comprise a hardware module such as an electronic circuit or a software module such as a software application. Thus, the means for determining may comprise the rate control module 920 of the apparatus 900, the rate control module 108 of the first wireless device 110, and/or the rate control module 252 of the network device 210.

The means for determining an effective aggregation size based on the communications error parameter, as well as the means for selecting a second communications profile from the plurality of communications profiles based on the communications error parameter and the effective aggregation size may comprise a processing system, which may comprise the processing system 910. For example, the processor 914 may also be configured with instruction code that may be stored in the memory 918 or the computer-readable medium 916 to determining the effective aggregation size based on the communications error parameter, as well as selecting a second communications profile from the plurality of communications profiles based on the communications error parameter and the effective aggregation size. The means for determining and the means for selecting may also comprise a hardware module such as an electronic circuit or a software module such as a software application. Thus, the means for determining may also comprise the rate control module 108 of the first wireless device 110, the rate control module 252 of the network device 210, or the rate control module 920 of the apparatus 900.

The means for transmitting a second frame using the second communications profile may comprise a transmitter such as the network interface 106 of the first device 110, the PHY controller 226 and PHY interface 228 of the network device 210, or the transceiver 950 of the apparatus 900.

The wireless device configured in accordance with the disclosure may also include means for updating a first throughput metric associated with the first communications profile based on the communications error parameter and the effective aggregation size; and means for selecting a communications profile from the plurality of communications profiles that includes a highest throughput metric as the second communications profile. These means comprise a processing system such as the processing system 910 of the apparatus, and/or the rate control module 920 of the apparatus 900. Further, these means may also comprise the rate control module 108 of the first wireless device 110, and/or the rate control module 252 of the network device 210.

A number of configurations and elements have been disclosed for a variety of devices that may provide the various functionality to support the means described herein for optimizing rate control. These examples should not be taken as limiting, but only as possible implementations of used to describe the various aspects of the disclosure contained herein.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Unless specifically stated otherwise, the term "some" refers to one or more. A phrase referring to "at least one of" a list of items refers to any combination of those items, including single members. As an example, "at least one of: A, B, or C" is intended to cover: A; B; C; A and B; A and C; B and C; and A, B and C.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communications comprising:
    detecting a receipt of a communications acknowledgment related to a transmission of a first frame using a first communications profile selected from a plurality of communications profiles;
    determining a communications error parameter from the detection of the receipt of the communications acknowledgement;
    determining an effective aggregation size based on the communications error parameter;
    selecting a second communications profile from the plurality of communications profiles based on the communications error parameter and the effective aggregation size; and
    transmitting a second frame using the second communications profile.

2. The method of claim 1, wherein each communications profile in the plurality of communications profiles comprises a throughput metric and the selection of the second communications profile comprises:
    updating a first throughput metric associated with the first communications profile based on the communications error parameter and the effective aggregation size; and
    selecting a communications profile from the plurality of communications profiles that comprises a highest throughput metric as the second communications profile.

3. The method of claim 2, wherein the update of the first throughput metric comprises adjusting an expected throughput for the first communications profile using the effective aggregation size and the communications error parameter.

4. The method of claim 3, wherein the adjustment of the expected throughput comprises modifying the expected throughput by the effective aggregation size and the communications error parameter.

5. The method of claim 1, wherein the determination of the effective aggregation size comprises determining, from a series of frame transmissions subject to the communications error parameter, an achievable aggregation size as the effective aggregation size.

6. The method of claim 1, wherein the effective aggregation size comprises a number of data units to be transmitted in a frame.

7. The method of claim 1, wherein each communications profile in the plurality of communications profiles comprises a communications error parameter, the method further comprising updating a first communications error parameter associated with the first communications profile based on the communications error parameter.

8. The method of claim 7, wherein the communications error parameter comprises a communications error parameter determined from the transmission of the first frame.

9. The method of claim 7, wherein the update of the first communications error parameter comprises replacing the first communications error parameter with the communications error parameter based on a determination that the communications error parameter is greater than the first communications error parameter.

10. The method of claim 1, wherein the communications acknowledgement comprises at least one of an acknowledgement (ACK), a block ACK (BA), or an ACK timeout.

11. The method of claim 1, wherein the second communications profile comprises at least one modulation and coding scheme.

12. The method of claim 1, wherein the communications error parameter comprises at least one of a packet error rate, a bit error rate, or a transmission error rate.

13. An apparatus for wireless communications comprising:
a receiver configured to detect a receipt of a communications acknowledgment related to a transmission of a first frame using a first communications profile selected from a plurality of communications profiles;
a processing system configured to:
determine a communications error parameter from the detection of the receipt of the communications acknowledgement;
determining an effective aggregation size based on the communications error parameter; and
selecting a second communications profile from the plurality of communications profiles based on the communications error parameter and the effective aggregation size; and
a transmitter configured to transmit a second frame using the second communications profile.

14. The apparatus of claim 13, wherein each communications profile in the plurality of communications profiles comprises a throughput metric and the processing system is further configured to:
update a first throughput metric associated with the first communications profile based on the communications error parameter and the effective aggregation size; and
select a communications profile from the plurality of communications profiles that comprises a highest throughput metric as the second communications profile.

15. The apparatus of claim 14, wherein the processing system is further configured to adjust an expected throughput for the first communications profile using the effective aggregation size and the communications error parameter.

16. The apparatus of claim 15, wherein the processing system is further configured to modify the expected throughput by the effective aggregation size and the communications error parameter.

17. The apparatus of claim 13, wherein the processing system is further configured to determine, from a series of frame transmissions subject to the communications error parameter, an achievable aggregation size as the effective aggregation size.

18. The apparatus of claim 13, wherein the effective aggregation size comprises a number of data units to be transmitted in a frame.

19. The apparatus of claim 13, wherein each communications profile in the plurality of communications profiles comprises a communications error parameter, the processing system is further configured to update a first communications error parameter associated with the first communications profile based on the communications error parameter.

20. The apparatus of claim 19, wherein the communications error parameter comprises a communications error parameter determined from the transmission of the first frame.

21. The apparatus of claim 19, wherein the processing system is further configured to replace the first communications error parameter with the communications error parameter based on a determination that the communications error parameter is greater than the first communications error parameter.

22. The apparatus of claim 13, wherein the communications acknowledgement comprises at least one of an acknowledgement (ACK), a block ACK, or an ACK timeout.

23. The apparatus of claim 13, wherein the second communications profile comprises at least one modulation and coding scheme.

24. The apparatus of claim 13, wherein the communications error parameter comprises at least one of a packet error rate, a bit error rate, or a transmission error rate.

25. An apparatus for wireless communication comprising:
means for detecting a receipt of a communications acknowledgment related to a transmission of a first frame using a first communications profile selected from a plurality of communications profiles;
means for determining a communications error parameter from the detection of the receipt of the communications acknowledgement;
means for determining an effective aggregation size based on the communications error parameter;
means for selecting a second communications profile from the plurality of communications profiles based on the communications error parameter and the effective aggregation size; and
means for transmitting a second frame using the second communications profile.

26. The apparatus of claim 25, wherein each communications profile in the plurality of communications profiles comprises a throughput metric and the means for selecting the second communications profile comprises:
means for updating a first throughput metric associated with the first communications profile based on the communications error parameter and the effective aggregation size; and means for selecting a communications profile from the plurality of communications profiles that comprises a highest throughput metric as the second communications profile.

27. The apparatus of claim 26, wherein the means for updating the first throughput metric comprises means for adjusting an expected throughput for the first communications profile using the effective aggregation size and the communications error parameter.

28. The apparatus of claim 27, wherein the means for adjusting the expected throughput comprises means for modifying the expected throughput by the effective aggregation size and the communications error parameter.

29. The apparatus of claim 25, wherein the means for determining the effective aggregation size comprises means for determining, from a series of frame transmissions subject to the communications error parameter, an achievable aggregation size as the effective aggregation size.

30. The apparatus of claim 25, wherein the effective aggregation size comprises a number of data units to be transmitted in a frame.

31. The apparatus of claim 25, wherein each communications profile in the plurality of communications profiles comprises a communications error parameter, the apparatus further comprising means for updating a first communications error parameter associated with the first communications profile based on the communications error parameter.

32. The apparatus of claim 31, wherein the communications error parameter comprises a communications error parameter determined from the transmission of the first frame.

33. The apparatus of claim 31, wherein the means for updating the first communications error parameter comprises means for replacing the first communications error parameter with the communications error parameter based on a determination that the communications error parameter is greater than the first communications error parameter.

34. The apparatus of claim 25, wherein the communications acknowledgement comprises at least one of an acknowledgement (ACK), a block ACK, or an ACK timeout.

35. The apparatus of claim 25, wherein the second communications profile comprises at least one modulation and coding scheme.

36. The apparatus of claim 25, wherein the communications error parameter comprises at least one of a packet error rate, a bit error rate, or a transmission error rate.

37. A non-transitory computer-readable storage medium comprising code executable by a processing system for:
   detecting a receipt of a communications acknowledgment related to a transmission of a first frame using a first communications profile selected from a plurality of communications profiles;
   determining a communications error parameter from the detection of the receipt of the communications acknowledgement;
   determining an effective aggregation size based on the communications error parameter;
   selecting a second communications profile from the plurality of communications profiles based on the communications error parameter and the effective aggregation size; and
   transmitting a second frame using the second communications profile.

38. A wireless device, comprising:
   an antenna;
   a receiver configured to detect, via the antenna, a receipt of a communications acknowledgment related to a transmission of a first frame using a first communications profile selected from a plurality of communications profiles;
   a processing system configured to:
      determine a communications error parameter from the detection of the receipt of the communications acknowledgement;
      determining an effective aggregation size based on the communications error parameter; and
      selecting a second communications profile from the plurality of communications profiles based on the communications error parameter and the effective aggregation size; and
   a transmitter configured to transmit a second frame using the second communications profile.

* * * * *